US010920638B2

(12) United States Patent
Schweizer

(10) Patent No.: US 10,920,638 B2
(45) Date of Patent: Feb. 16, 2021

(54) METHOD FOR CONTROLLING AN SCR CATALYTIC CONVERTER

(71) Applicant: Robert Bosch GmbH, Stuttgart (DE)

(72) Inventor: Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 16/246,610

(22) Filed: Jan. 14, 2019

(65) Prior Publication Data

US 2019/0218950 A1 Jul. 18, 2019

(30) Foreign Application Priority Data

Jan. 12, 2018 (DE) .................... 10 2018 200 489.7

(51) Int. Cl.
*F01N 3/00* (2006.01)
*F01N 3/20* (2006.01)
*F01N 9/00* (2006.01)
*F01N 11/00* (2006.01)

(52) U.S. Cl.
CPC ............. *F01N 3/208* (2013.01); *F01N 9/005* (2013.01); *F01N 11/005* (2013.01); *F01N 2900/0406* (2013.01); *F01N 2900/0601* (2013.01); *F01N 2900/1622* (2013.01); *F01N 2900/1812* (2013.01)

(58) Field of Classification Search
CPC ........ F01N 11/005; F01N 9/005; F01N 3/208; F01N 2900/0601

USPC .......................................................... 60/274
See application file for complete search history.

(56) References Cited

U.S. PATENT DOCUMENTS

| | | | | |
|---|---|---|---|---|
| 2004/0098968 A1* | 5/2004 | van Nieuwstadt | ...... | F01N 9/005 60/277 |
| 2005/0282285 A1* | 12/2005 | Radhamohan | .......... | F01N 3/281 436/55 |
| 2007/0204600 A1* | 9/2007 | Kubinski | ........... | B01D 53/9495 60/286 |
| 2010/0242454 A1* | 9/2010 | Holderbaum | ...... | B01D 53/9409 60/301 |
| 2013/0263575 A1* | 10/2013 | Sun | ........................ | F01N 11/00 60/274 |

FOREIGN PATENT DOCUMENTS

WO 2009036780 3/2009

* cited by examiner

*Primary Examiner* — Jason D Shanske
(74) *Attorney, Agent, or Firm* — Michael Best & Friedrich LLP

(57) ABSTRACT

The invention concerns a method for controlling an SCR catalytic converter. A first modelled level of ammonia (NH3_mod1) and a second modelled level of ammonia (NH3_mod2) of the SCR catalytic converter are determined from two different models. The second modelled level of ammonia (NH3_mod2) is assessed by comparing it with the first modelled level of ammonia (NH3_mod1).

10 Claims, 4 Drawing Sheets

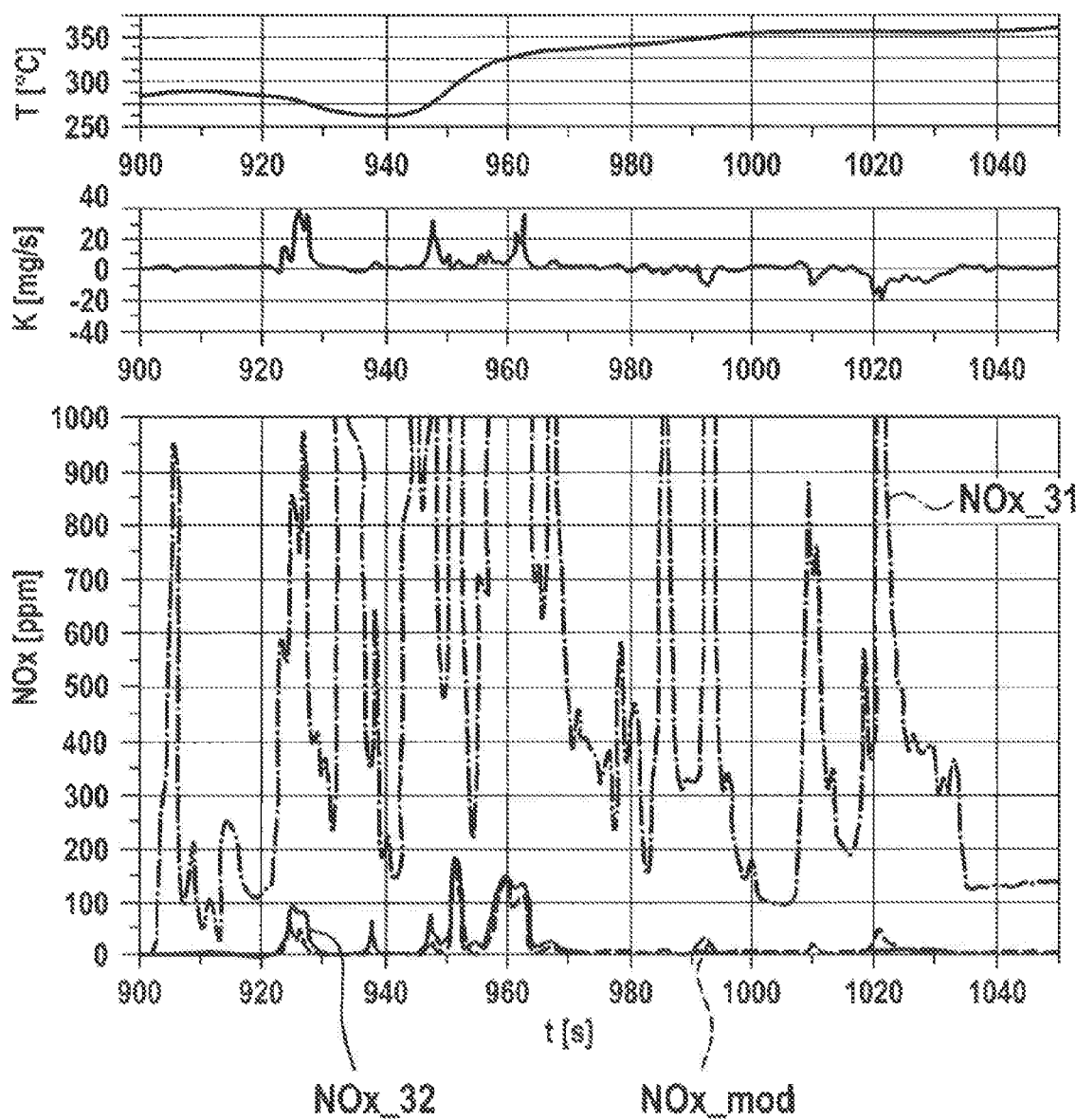

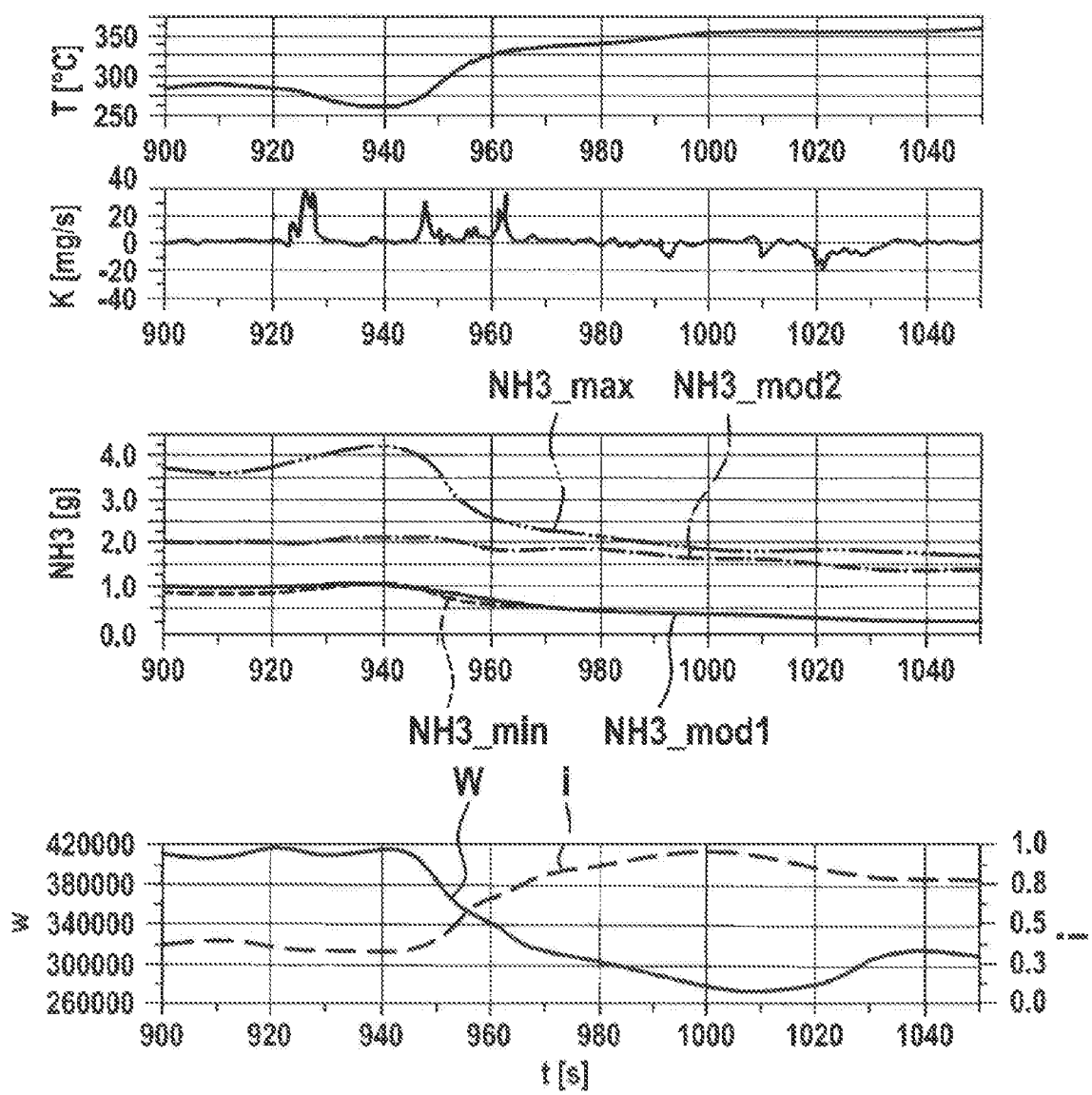

US 10,920,638 B2

METHOD FOR CONTROLLING AN SCR CATALYTIC CONVERTER

BACKGROUND OF THE INVENTION

The present invention concerns a method for controlling an SCR catalytic converter. Furthermore, the present invention concerns a computer program that carries out each step of the method, and a machine-readable memory medium that stores the computer program. Finally, the invention concerns an electronic control unit that is designed to carry out the method.

A promising method for reducing oxides of nitrogen in oxygen-rich exhaust gases is selective catalytic reduction (SCR) by means of ammonia or ammonia-reducing reagents. The efficiency of an SCR catalytic converter is a function of the temperature thereof, of the space velocity of the exhaust gas and most decisively on the level of ammonia absorbed on the surface thereof. As absorbed ammonia is also available in addition to the directly dispensed ammonia for reduction of oxides of nitrogen, the efficiency of the SCR catalytic converter is increased compared to an empty catalytic converter. The storage behavior is dependent on the respective operating temperature of the catalytic converter. The lower the temperature, the greater is the storage capacity.

If an SCR catalytic converter has completely filled the storage thereof, then in the event of load steps of a combustion engine, the exhaust gases thereof are reduced by means of the SCR catalytic converter, even if ammonia slip occurs if no further ammonia or no ammonia-reducing reagents are dispensed into the exhaust system. If very high nitrogen oxide conversions are to be achieved, then it is essential to operate the SCR system with a high level of ammonia. If the temperature of the completely full SCR catalytic converter then rises because of a load step of the combustion engine, then the ammonia storage capacity thereof decreases, which results in ammonia slip.

Said effect is particularly pronounced as a result of SCR catalytic converters being installed close to the combustion engine, so that the SCR catalytic converter reaches the operating temperature thereof rapidly following a cold start of the combustion engine. A second SCR catalytic converter downstream of the first SCR catalytic converter can therefore be provided in the exhaust system to absorb ammonia from the ammonia slip of the first catalytic converter and then to convert it. For cost reasons, in general only one dosing valve is installed upstream of the first SCR catalytic converter to dispense an ammonia reducing solution of reducing agent into the exhaust system. Filling of ammonia into the second SCR catalytic converter is thus carried out only by ammonia slip of the first SCR catalytic converter.

If too little is added, then the first SCR catalytic converter empties. As a result, the ammonia slip reduces, and the potential of the second SCR catalytic converter is not used. The conversion of nitrogen oxides is too little and emission limits may be exceeded.

If too much is added, the level of ammonia in the first SCR catalytic converter is too high. This results in excessive ammonia slip, so that a short time later the level of ammonia in the second SCR catalytic converter is also too high. Reducing ammonia in the second SCR catalytic converter is difficult, because the first SCR catalytic converter then passes too little nitrogen oxide to decrease the level in the second SCR catalytic converter. Ammonia slip after the second SCR catalytic converter is undesirable for environmental reasons. Maintaining the optimum physical filling of ammonia in both SCR catalytic converters for long-term operation is impossible without an additional control strategy, even with very small tolerances.

Therefore, with SCR systems during operation the actual efficiency is continuously compared with the setpoint efficiency from a model. With modern systems, adjustment methods are available to bring the actual efficiency towards the setpoint efficiency as much as possible. Ideally, the actual efficiency should be the same as the setpoint efficiency. In order to ensure safe and robust operation, a certain control reserve is necessary and must be maintained over the lifetime by means of conservative ageing corrections. Owing to the control reserve, the more the conversion of nitrogen oxides is lost, the more robust the application is desired to be. A control reserve thus increases the system costs. If there is no control reserve and the setpoint efficiency from the model is greater than the actual efficiency of the SCR catalytic converters, then the adjustment methods seek to increase the actual efficiency by means of greater added amounts. The actual level of ammonia rises far above the modelled level of ammonia and results in unexpectedly high ammonia slip. The ammonia slip is then falsely interpreted by the software as nitrogen oxide slip, which results in a further increase in the added amount. In this case, only complex robustness measures can avoid controller instability.

SUMMARY OF THE INVENTION

In the method for controlling an SCR catalytic converter, two different models of the ammonia level thereof are created. By this means, a first modelled level of ammonia and a second modelled level of ammonia of the SCR catalytic converter are determined. The second modelled level of ammonia is assessed by comparing it with the first modelled level of ammonia. Such an assessment enables a particularly robust determination of the level of ammonia of the SCR catalytic converter to be carried out. If a robust indication of the level of ammonia is available, on the one hand the maximum efficiency of the nitrogen oxide conversion in the SCR catalytic converter can be controlled and on the other hand the ammonia slip downstream of the SCR catalytic converter can be adjusted to low applicable values. In this case, a control reserve can be dispensed with. Thus, either the overall efficiency of the SCR catalytic converter can be increased, or the volume of the SCR catalytic converter can be reduced for the same efficiency.

Furthermore, it is preferred that the second modelled level of ammonia is compared with a maximum level of ammonia of the SCR catalytic converter during the assessment. In this case, the maximum level of ammonia means a level of ammonia at which the SCR catalytic converter is filled with ammonia to the extent that a specifiable ammonia slip occurs at the SCR catalytic converter. This should in particular be so high that it can be measured by means of sensors and can for example be 50 ppm. At said maximum level of ammonia, the maximum physical efficiency of the nitrogen oxide conversion of the SCR catalytic converter is also achieved.

Whereas a set of model parameters is required for the SCR catalytic converter to determine the maximum efficiency of the nitrogen oxide conversion for the current operating conditions, the minimum efficiency can be determined by means of a second set of model parameters. Said minimum efficiency pertains if the SCR catalytic converter has a minimum level of ammonia at which nitrogen oxide conversion is possible. The first modelled level of ammonia is preferably adjusted to a setpoint value at which it is particularly preferred to deal with said minimum level of ammonia.

The two different models can in particular differ in that the first model has no controller components and the second model has controller components. The first model, i.e. the model without controller components, is engaged in this case and controls the setpoint value of the level of ammonia in the first SCR catalytic converter.

The first model without controller components is in particular implemented by reducing an ammonia addition amount by a correction amount. The second model, which comprises controller components, can in particular be implemented by multiplying the ammonia addition amount by an adjustment factor. In this case, in both models the added amount of ammonia results from the ammonia dispensed by means of a dosing valve upstream of the SCR catalytic converter.

It is preferred that an interpolation factor for a setpoint efficiency of the SCR catalytic converter is determined from the result of the assessment. By using said interpolation factor, the efficiency of the model of the SCR catalytic converter can be continuously adjusted to a maximum physical efficiency, so that a control reserve is no longer necessary.

If the SCR catalytic converter is part of an SCR catalytic converter system with a plurality of SCR catalytic converters, the method is then preferably provided for controlling the SCR catalytic converter of the SCR catalytic converter system that is the furthest upstream. As said SCR catalytic converter receives an ammonia addition amount exclusively for one or more metering valves and not by ammonia slip of another SCR catalytic converter, the method can be used for said SCR catalytic converter with particularly high accuracy.

The computer program is arranged to carry out each step of the method, in particular when running on a computing device or on an electronic control unit. It enables the implementation of different embodiments of the method in an electronic control unit without design changes having to be carried out on said unit. For this purpose, it is stored on the machine-readable memory medium.

By running the computer program on a conventional electronic control unit, the electronic control unit that is arranged to control an SCR catalytic converter by means of the method will be obtained.

BRIEF DESCRIPTION OF THE DRAWINGS

An exemplary embodiment of the invention is represented in the drawings and is described in detail in the following description.

FIG. 4 shows in a plurality of diagrams how a modelled nitrogen oxide signal and measured nitrogen oxide signals change in an exemplary embodiment of the method according to the invention in the event of a change of an SCR catalytic converter temperature and a correction amount against time.

FIG. 5 shows in a plurality of diagrams how a plurality of modelled levels of ammonia of an SCR catalytic converter, an efficiency factor of a catalytic converter model and an interpolation factor change in an exemplary embodiment of the method according to the invention in the event of the change of an SCR catalytic converter temperature and a correction amount against time.

DETAILED DESCRIPTION

Figure 1:
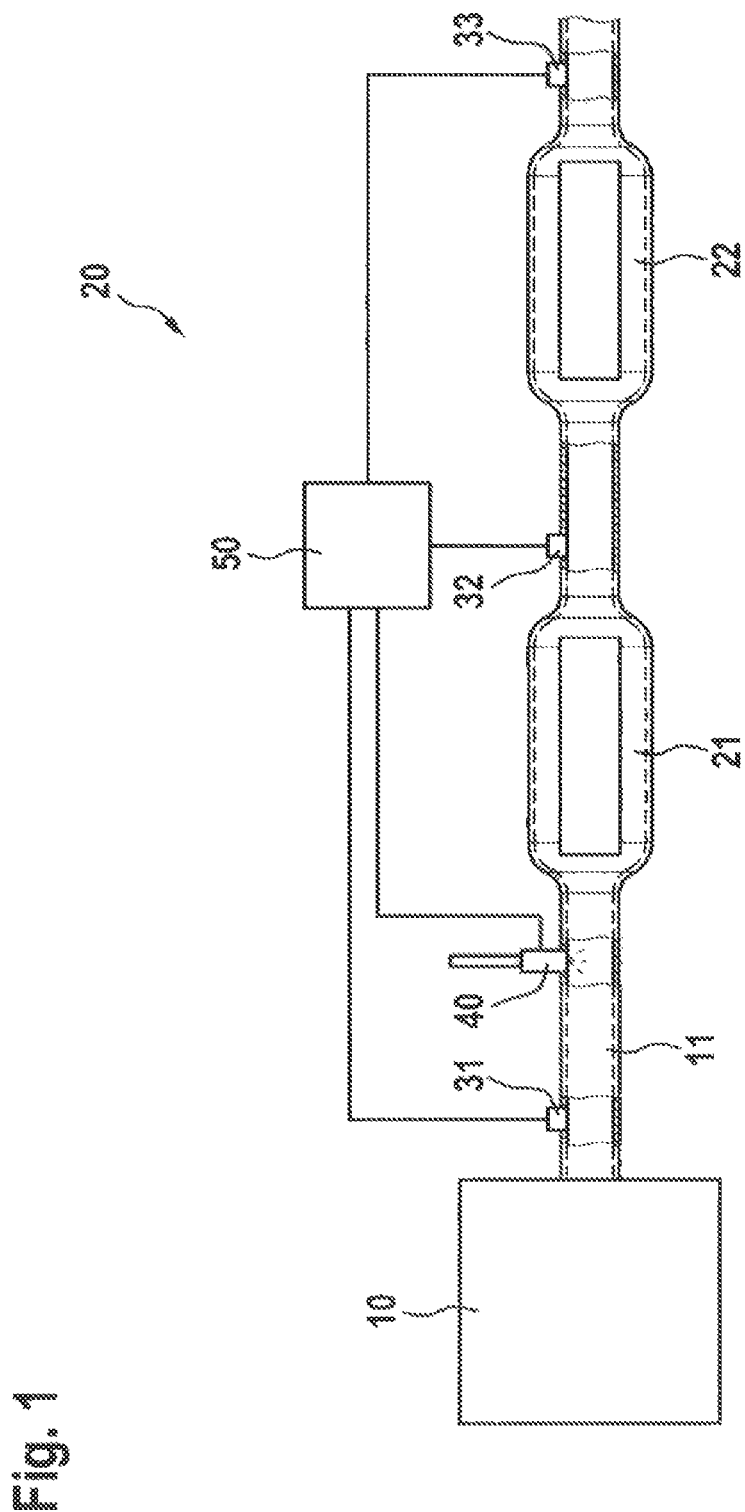
FIG. 1 shows schematically an SCR catalytic converter system in which an SCR catalytic converter can be controlled by means of an exemplary embodiment of the method according to the invention.

A combustion engine 10 comprises in the exhaust system 11 thereof an SCR catalytic converter system 20 that is represented in FIG. 1. Said system comprises a reducing agent metering unit 40, with which a urea-water solution can be injected into the exhaust system 11. Ammonia is released from this at the high temperatures of the exhaust gas. A first SCR catalytic converter 21 and a second SCR catalytic converter 22 are disposed downstream of the reducing agent metering unit 40. The catalytic converter material of the first SCR catalytic converter is disposed on a particle filter (SCR on filter; SCRF). A first NOx sensor 31 is disposed in the exhaust system 11 upstream of the sensor reducing agent metering unit 40. A second NOx sensor 32 is disposed between the two SCR catalytic converters 21, 22. A third NOx sensor is disposed downstream of the second SCR catalytic converter 22. All the NOx-sensors 31, 32, 33 pass the signals thereof to an electronic control unit 50.

Figure 2:
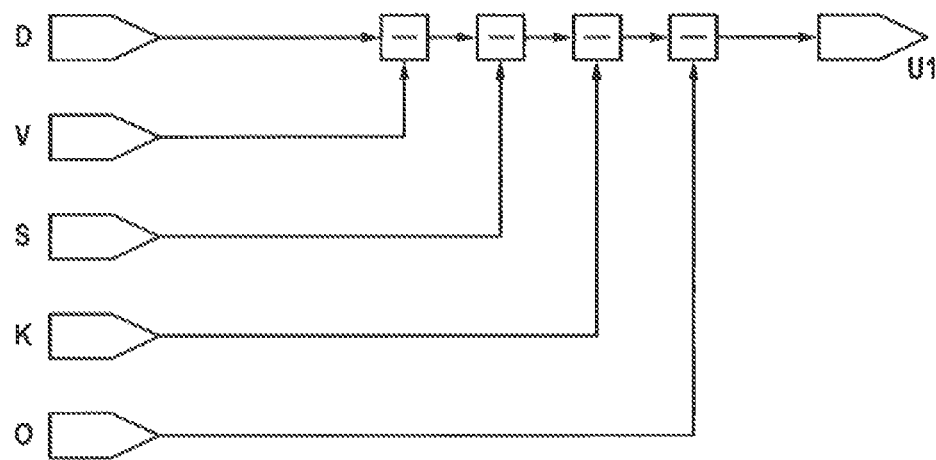
FIG. 2 shows schematically a level of ammonia model without controller components in an exemplary embodiment of the method according to the invention.

In the electronic control unit 50, two different models of the ammonia level of the first SCR catalytic converter 21 are created. The first model, which has no controller components, is schematically represented in FIG. 2. A dispensed amount D is determined from a dispensing demand from the electronic control unit 50 to the dosing valve 40. An amount of ammonia V consumed by the SCR reaction, an ammonia slip S, a correction amount K from a controller and the oxidation O of ammonia in the SCR catalytic converter 21 are subtracted from said dispensed amount of ammonia. This results in a mass balance flow U1 of ammonia through the first SCR catalytic converter 21. The amount of ammonia consumed V corresponds in each case to the nitrogen oxide mass flow multiplied by a stoichiometry factor for the mass difference between nitrogen oxide and ammonia. In this case, the molecular weight of $NO_2$ is taken as basis for the nitrogen oxides. If there is no ammonia slip at the first SCR catalytic converter 21, then the converted nitrogen oxide mass flow in the first SCR catalytic converter corresponds to the difference of the signals of the first nitrogen oxide sensor 31 and the second nitrogen oxide sensor 32. On the other hand, if there is ammonia slip, then the fact that the second nitrogen oxide sensor 32 reacts to ammonia cross-sensitively is to be taken into account. The respective current level of ammonia in the first SCR catalytic converter 21 is calculated in said model by changing a previous level of ammonia by the mass balance flow U1.

Figure 3:
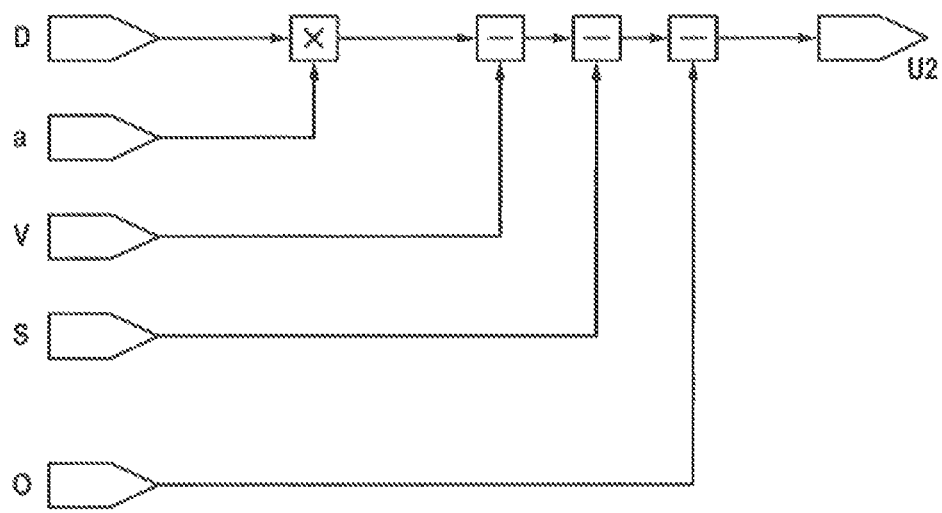
FIG. 3 shows schematically a level of ammonia model with controller components in an exemplary embodiment of the method according to the invention.

FIG. 3 shows schematically a second model of the ammonia level in the first SCR catalytic converter 21, which comprises controller components. While controller components are subtracted in the first model as a correction amount, in the second model they are brought into balance by multiplying the dispensed amount D by an adjustment factor a. The amount of ammonia V consumed, the ammonia slip S and the oxidation O of ammonia are subtracted from said product as in the first model. In this way, in turn a mass balance flow U2 is obtained by which a level of ammonia of the first SCR catalytic converter 21 that was previously stored in the second model is changed.

FIG. 4 shows how in a conventional operation of the first SCR catalytic converter 21 a positive or negative correction amount K is produced by a controller in the event of a change of the temperature T of the first SCR catalytic converter 21 with time t. A nitrogen oxide signal NOx_31 of the first nitrogen oxide sensor 31 indicates the nitrogen oxide emissions of the combustion engine 10. A nitrogen oxide signal NOx_32 of the second nitrogen oxide sensor 32 indicates the amount of nitrogen oxide based on the first SCR catalytic converter 21. A model value NOx_mod of the nitrogen oxide downstream of the first SCR catalytic converter 21 differs from the signal NOx_32 of the second nitrogen oxide sensor 32. The controller seeks to compensate said deviations with the correction amount K. Said control is referred to as a level watcher. If the second nitrogen oxide sensor 32 indicates higher values than the nitrogen oxide model, then the level watcher outputs a positive correction amount in order to fill the level of ammonia in the first SCR catalytic converter 21 and thereby to reset the setpoint emissions of the model.

FIG. 5 shows how the modelled levels of ammonia of the two models according to FIGS. 2 and 3 are taken into account in an exemplary embodiment of the method according to the invention. The first modelled level of ammonia NH3_mod1 is controlled to the minimum level of ammonia NH3_min of the first SCR catalytic converter 21 as a setpoint value. It contains no controller component of the level watcher in order to be able to compensate the corresponding missing amount in the first SCR catalytic converter 21. On the other hand, the level of ammonia controller component is taken into account in the second modelled level of ammonia NH3_mod2, which results from the second model. A difference between the two modelled levels of ammonia NH3_mod1 and NH3_mod2 results from this. By considering the difference between the second modelled level of ammonia NH3_mod2 and the first modelled level of ammonia NH3_mod1 on the one hand, and on the other hand the difference between the second modelled ammonia level NH3_mod2 and the maximum physical level of ammonia NH3_max, an assessment of the second modelled level of ammonia NH3_mod2 is possible. This is carried out in the present exemplary embodiment by interpolation. This enables the calculation of an efficiency factor w of the catalytic converter model on the one hand, and therefrom the calculation of an interpolation factor i. This can then influence the setpoint efficiency value of the level of ammonia model of the first SCR catalytic converter 21. If in the present exemplary embodiment, chemical reaction kinetics based on the Arrhenius equation are used in the currently usual manner for the SCR reaction, then the interpolation factor directly changes the efficiency the SCR-model there by means of a change of the frequency factor of the nitrogen oxide conversion reaction. In the case of a rising value of the second modelled level of ammonia NH3_mod2, the efficiency requirement is slightly reduced, in the case of a falling value it is accordingly increased. The first SCR catalytic converter 21 is thus always operated at the maximum efficiency of the SCR reaction.

The invention claimed is:

1. A method for controlling ammonia provided to an SCR catalytic converter (21), the method comprising:
determining, via a computer, a first modelled level of ammonia (NH3_mod1) from a first model and a second modelled level of ammonia (NH3_mod2) of the SCR catalytic converter (21) from a second model that is different from the first model,
assessing, via the computer, the second modelled level of ammonia (NH3_mod2) by comparing it with the first modelled level of ammonia (NH3_mod1), and
controlling a dispensed ammonia amount (D) by a dosing valve upstream of the SCR catalytic converter in response to at least one of the first modelled level of ammonia (NH3_mod1) and the second modelled level of ammonia (NH3_mod2),
wherein an interpolation factor (i) of a setpoint efficiency value of the SCR catalytic converter is determined from the result of the assessment.

2. The method according to claim 1, wherein the second modelled level of ammonia (NH3_mod2) is further compared during the assessment with a maximum level of ammonia (NH3_max) of the SCR catalytic converter (21), wherein at the maximum level of ammonia (NH3_max) a specifiable ammonia slip occurs at the SCR catalytic converter (21).

3. The method according to claim 1, wherein the first modelled level of ammonia (NH3_mod1) is adjusted to a setpoint value (NH3_min) by controlling the dosing valve.

4. The method according to claim 1, wherein the first model reduces the dispensed ammonia amount and the second model adds to the dispensed ammonia amount.

5. The method according to claim 4, wherein in the first model the dispensed ammonia amount (D) dispensed by the dosing valve is reduced by a correction amount (K) and in the second model the dispensed ammonia amount (D) dispensed by the dosing valve is multiplied by an the adjustment factor (a).

6. The method according to claim 1, wherein the SCR catalytic converter (21) is part of an SCR catalytic converter system (20) with a plurality of SCR catalytic converters (21, 22), wherein the SCR catalytic converter (21) is the furthest upstream SCR catalytic converter of the SCR catalytic converter system (20).

7. The method according to claim 6, wherein the SCR catalytic converter system is free from a control reserve.

8. The method according to claim 1, wherein the controlling of ammonia dispensed by the dosing valve upstream of the SCR catalytic converter is in response to the comparison of the second modelled level of ammonia (NH3_mod2) with the first modelled level of ammonia (NH3_mod1).

9. A method for controlling ammonia provided to an SCR catalytic converter (21) of an SCR catalytic converter system (20) with a plurality of SCR catalytic converters (21, 22), wherein the SCR catalytic converter (21) is the furthest upstream SCR catalytic converter of the SCR catalytic converter system (20), the method comprising:
determining, via a computer, a first modelled level of ammonia (NH3_mod1) from a first model and a second modelled level of ammonia (NH3_mod2) of the SCR catalytic converter (21) from a second model that is different from the first model, and
assessing, via the computer, the second modelled level of ammonia (NH3_mod2) by comparing it with the first modelled level of ammonia (NH3_mod1), and
controlling a dispensed ammonia amount (D) by a dosing valve upstream of the SCR catalytic converter with an adjustment for the second modelled level of ammonia (NH3_mod2) and an adjustment for the first modelled level of ammonia (NH3_mod1),
wherein an interpolation factor (i) of a setpoint efficiency value of the SCR catalytic converter is determined from the result of the assessment.

10. The method according to claim 9, wherein in the first model the adjustment for the dispensed ammonia amount (D) dispensed by the dosing valve is reduced by a correction amount (K) and in the second model the adjustment for dispensed ammonia amount (D) dispensed by the dosing valve is provided by multiplying the dispensed ammonia amount by an adjustment factor (a).

\* \* \* \* \*